(12) United States Patent
Pabalan et al.

(10) Patent No.: US 7,671,099 B2
(45) Date of Patent: Mar. 2, 2010

(54) METHOD FOR SPEARATION CRUDE OIL EMULSIONS

(75) Inventors: Ruela Talingting Pabalan, Burlington, NJ (US); Gary Woodward, Northwich Cheshire (GB); Manilal Dahanayake, Princeton Junction, NJ (US); Herve Adam, Princeton, NJ (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 12/191,130

(22) Filed: Aug. 13, 2008

(65) Prior Publication Data

US 2009/0048352 A1 Feb. 19, 2009

Related U.S. Application Data

(60) Provisional application No. 60/955,551, filed on Aug. 13, 2007.

(51) Int. Cl.
*B01D 17/05* (2006.01)
(52) U.S. Cl. .................. 516/181; 516/182; 516/191
(58) Field of Classification Search ................. 516/181
See application file for complete search history.

(56) References Cited

U.S. PATENT DOCUMENTS

| | | | | |
|---|---|---|---|---|
| 2,549,435 | A * | 4/1951 | Pettingill et al. | 516/191 |
| 6,476,168 | B1 * | 11/2002 | Dahanayake et al. | 526/303.1 |
| 6,846,798 | B2 * | 1/2005 | Joye et al. | 510/506 |
| 7,501,470 | B2 | 3/2009 | Adam et al. | |

* cited by examiner

*Primary Examiner*—Ling-Siu Choi
*Assistant Examiner*—Chun-Cheng Wang

(57) ABSTRACT

A method for breaking an emulsion of oil and water comprising contacting the emulsion with a demulsifier comprising a terpene alkoxylate is disclosed.

6 Claims, No Drawings

METHOD FOR SPEARATION CRUDE OIL EMULSIONS

CROSS-REFERENCE TO RELATED APPLICATIONS

Benefit of U.S. provisional application 60/955,551, filed Aug. 13, 2007, is claimed.

BACKGROUND OF THE INVENTION

The present invention generally relates to water-in-oil demulsifiers having low toxicity for use in breaking emulsions in crude oil.

Natural resources such as gas, oil, minerals, and water residing in subterranean formations can be recovered by drilling wells in the formations. Emulsions comprising oil and water commonly occur in the extraction, production, and processing and refining of oil. It is often necessary to separate the water from the oil in order to effectively prepare the oil for further processing or refinement. Numerous demulsifiers are known in the art for removing water from such emulsions. Demulsifiers are typically composed of one or more surfactants dispersed in a solvent system and may be derived, for example, from alcohols, fatty acids, fatty amines, glycols, and alkylphenol condensation products.

Among the crude oil demulsification methods in use today, electrostatic separation, gravity separation, centrifugation, and hydrocyclone-assisted separation are frequently used. In such methods, wash water is added until the crude oil's water content is in the range of about 4% to about 15% by volume, and a chemical demulsifier formulation is added so that the oil and the aqueous phases can be separated by separation methods known in the art.

Effective demulsification requires addition a chemical demulsifier to the wash water or to the crude prior to application of an electrostatic field or centrifugal force to the crude oil emulsion. Crude oils that contain high amounts of asphaltenes and naphthenic acids are generally called heavy crude oils and are difficult to demulsify. These crude oils require specifically tailored demulsifiers for demulsification to be effective. Many demulsifiers have phenolic groups in their chemical structure. In some cases, demulsifiers that do not contain phenolic groups and are effective on crude oils containing asphaltenes and naphthenic acids are desired.

The ecological impact of offshore crude oil extraction increasingly receives attention and is the subject of scrutiny by regulatory agencies as well as the public. Environmental regulatory agencies, both national and international, have determined that demulsifiers containing nonylphenyl alkoxylates and related compounds have a deleterious effect on the marine environment. Therefore, a need exists for crude oil demulsifiers that will less adversely impact the environment, such as by having lower toxicity levels, especially in the marine environment. There is also a need for demulsifiers for crude oil emulsions which have lower toxicity levels, especially when used in a marine environment. In addition to the needs for demulsifiers for separating crude oil which have low toxicity and are environmentally friendly, there is a need for demulsifier formulations containing low levels of surfactants.

SUMMARY OF THE INVENTION

The present invention fills the foregoing needs by providing in one aspect a method of demulsifying crude oil emulsions comprising contacting the emulsion with a demulsifier comprising a terpene alkoxylate.

In some embodiments, the present invention comprises contacting the crude oil emulsion with a terpene alkoxylate having the formula (VIII)

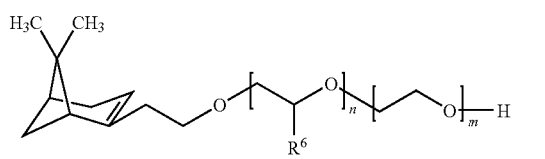

(VIII)

wherein $R^6$ is methyl or ethyl, n is from about 10 to about 30, and m is from 0 to about 30. In some specific embodiments $R^6$ is methyl, n is about 15 to 20, and m is about 3 to 7.

In some embodiments the invention can comprise dispensing the demulsifier in a suitable solvent prior to contacting the demulsifier with the emulsion.

The optional solvent can be, for example, selected from the group consisting of glycols, glycol ethers, alcohols, water, hydrocarbons, aromatic solvents, fatty acid methyl esters, and combinations thereof.

The crude oil emulsions demulsified by the invention can be water-in-oil emulsions or oil in water emulsions.

In some embodiments a mixture of two or more terpene alkoxylates can be used, and in other embodiments the terpene alkoxylate can be combined with one or more other surfactants selected from the group consisting of alkylsulfosuccinates, alkylphosphonic acids, salts of alkylsulfosuccinates, salts of alkylphosphonic acids, ethylene oxide/propylene oxide copolymers, ethoxylated fatty acid esters of polyethylene glycol, and modified alkanomides.

In certain embodiments the demulsifier is formulated with relatively low surfactant levels.

DETAILED DESCRIPTION OF THE INVENTION

The present invention generally relates to crude oil demulsifiers (also known as "emulsion breakers") for resolving or otherwise "breaking" emulsions that typically form during crude oil extraction or refinement. More specifically, the present invention generally relates to water-in-oil demulsifiers having low toxicity and comprising one or more of an anionic surfactant and a nonionic surfactant.

As used herein, the term "demulsifier" shall mean a surfactant or combination of surfactants that inhibits or prevents dispersion in an emulsion, thereby permitting the immiscible substances to be more readily separated from one another.

"Water clarification" is the removal of non-complying substances (e.g. crude oil) from water prior to disposal. Oil may be removed using a combination of demulsifiers and mechanical methods as disclosed herein. Demulsifiers are evaluated by inversion testing and closed bottle testing of crude oils. Measure of water clarity is obtained by treating the produced water using chemistry-in-bottle testing, bench model float-cell testing, and jar testing to determine optimum demulsification. Measure of water clarity can be made visually, by spectroscopic methods, by turbidimetric methods, or by any other methods known to persons skilled in the art. Oil clarity can be measured by determining the water content by conductiometric methods, Karl Fischer methods, or any other methods known to persons skilled in the art. In selecting demulsifiers, it is important that the discharge water meets process effluent specifications.

Surfactants are used in a demulsifier composition to coalesce the oil droplets. While not bound by any theory it is believed that surfactants disrupt the oil-water interface and allow combination of smaller oil droplets to larger oil droplets and aid in their separation from water.

The demulsifiers of the present invention may be used to prevent, break, or resolve water-in-oil or oil-in-water type emulsions, particularly crude oil emulsions. The present demulsifiers may also be used to break hydrocarbon emulsions derived from refined mineral oil, gasoline, kerosene, etc. The present demulsifiers may be applied at any point during the petroleum oil extraction and/or production process as is commonly known in the art. For instance, the present demulsifiers may be introduced at the well head; via downhole injection, either continuously or periodically; or at any point between the wellhead and the final oil storage.

The surfactants are added to the crude oil emulsions in concentrations that range preferably from about 50 parts per million ("ppm") to about 10,000 ppm of the liquid component volume and more preferably from about 125 ppm to about 2000 ppm of the liquid component volume.

The surfactants comprise one or more terpene alkoxylates and optionally one or more anionic or nonionic surfactants. Terpene alkoxylates found to be useful for breaking oil-water emulsions are terpene-based surfactants derived from a renewable raw materials such as α-pinene and β⁻-pinene, and have a C-9 bicyclic alkyl hydrophobe and polyoxy alkylene units in an block distribution or intermixed in random or tapered distribution along the hydrophilic chain. Suitable terpene alkoxylate surfactants are described in the U.S. Patent Application Publication No. 2006/0135683 to Adam al., Jun. 22, 2006, which is hereby incorporated by reference.

Preferred terpene alkoxylates are nopol alkoxylate surfactants and have the general formula:

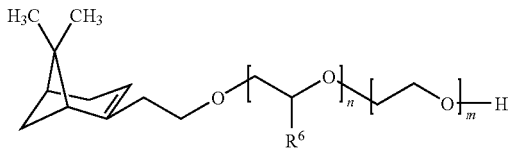

(VIII)

where $R^6$ is hydrogen, $CH_3$, or $C_2H_5$; n is from about 10 to about 30; m is from about 0 to about 30. The "n" and "m" units may be of block distribution or intermixed in random or tapered distribution along the chain.

In another preferred embodiment, $R^6$ is $CH_3$; n is from about 15 to about 20; m is from about 3 to about 7.

In certain embodiments, the terpene alkoxylate surfactant is the product sold under the trade name RHODOCLEAN® HP (Rhodia Inc., Cranbury, N.J.).

Anionic surfactants useful in the demulsifier composition in combination with the terpene alkoxylates include but are not limited to alkylsulfosuccinates, alkylphosphonic acids, and their salts, and combinations thereof. Preferred anionic surfactants are sulfosuccinates such as sodium dioctylsulfosuccinate, which may be used as the anionic surfactant in either powder form or in solution. In other preferred embodiments of the invention, the anionic surfactant may be octylphosphonic acid, laurylphosphonic acid, salts of octylphosphonic acid, salts of laurylphosphonic acid, and combinations thereof.

Suitable anionic surfactants include the following structural formulas:

Alkyl phosphonic acid and salts of the formula $R^1PO_3MM^1$ (I); phosphinic acid and salts of the formula $R^1R^2POM$ (IX); alkyl phosphoric acids and salts of the formula $R^1OPO_3MM^1$ (X); and dialkyl phosphoric acids and salts of the formula $(R^1O)(R^2O)POOM^1$ (XI); wherein $R^1$ and $R^2$ are may be the same or different alkyl groups and may be branched or linear; M and $M^1$ can be the same or different, selected from the group consisting of hydrogen, an alkali metal such as sodium or potassium, and an ammonium salt. $R^1$ preferably contains 5 to 20 carbon atoms, more preferably 5 to 16 atoms, most preferably 8 to 12 carbon atoms.

Suitable anionic surfactants also include alkylsulfosuccinates of the formula

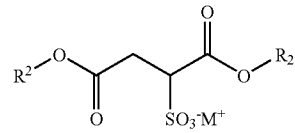

(II)

wherein $R^2$ is selected from the group consisting of alkyl, $-CH_2CH_2OH$, aryl, alkaryl, alkoxy, alkylarylalkyl, arylalkyl, alkylamidoalkyl and alkylaminoalkyl. In alkylsulfosuccinate embodiments in which $R^2$ represents alkyl, the group preferably has about 5 to about 20 carbon atoms and more preferably has about 10 to about 18 carbon atoms. In alkylsulfosuccinate embodiments in which $R^2$ represents aryl, the group preferably comprises a phenyl, diphenyl, diphenylether, or naphthalene moiety. M is preferably selected from hydrogen, an alkali metal such as sodium or potassium, or an ammonium salt. M is preferably an alkali metal such as sodium or potassium, more preferably sodium.

Nonionic surfactants which can be combined with the terpene alkoxylates include but are not limited to linear copolymers, block copolymers, and reverse copolymers of ethylene oxide/propylene oxide; ethoxylated fatty acids of polyethylene glycol/polypropylene glycol; fatty acid esters; glycerol esters; ethoxylated fatty acids esters of glycol; ethoxylated fatty acid esters of polyethylene glycol; terpene alkoxylates, modified alkanolamides and sorbitan esters.

Preferred nonionic surfactants are ethylene oxide/propylene oxide copolymers, ethoxylated fatty acids esters of glycol, ethoxylated fatty acid esters of polyethylene glycol, terpene alkoxylates and modified alkanomides. More preferred nonionic surfactants are ethylene oxide/propylene oxide copolymers, ethoxylated fatty acid esters of polyethylene glycol, terpene alkoxylates, and combinations thereof.

Suitable non-ionic surfactants which can be combined with the terpene alkoxylates include the surfactants having the structural formulas as shown below. Suitable ethylene oxide/propylene oxide copolymers may be selected from the group consisting of ethylene oxide/propylene oxide block copolymers, ethylene oxide/propylene oxide alkoxylates, and ethylene oxide/propylene oxide reverse copolymers.

Ethyleneoxide/Propyleneoxide Block Copolymer Surfactant

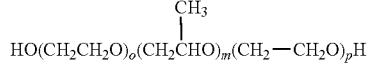

(III)

Ethyleneoxide/Propyleneoxide Reverse Copolymer Surfactant

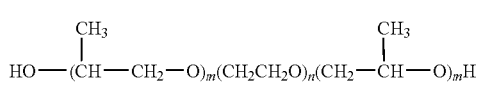
(IV)

In preferred embodiments "m" is from about 10 to 60 and "n" is about 0 to about 15. In a preferred embodiment, "m" is about 27, and "n" is about 8. In an alternative preferred embodiment, the nonionic surfactant is the product sold under the trade name ANTAROX® 31R1 (Rhodia Inc., Cranbury, N.J.).

Ethylene Oxide/Propylene Oxide Alkoxylates

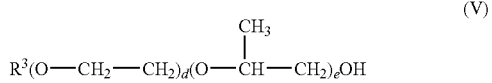
(V)

In preferred embodiments, "d" is from about 1 to about 10 and "e" is from about 1 to about 50. $R^3$ is a hydrocarbon chain hydrocarbon chain containing about 1 to about 22 carbon atoms and may be branched or straight-chained and saturated or unsaturated.

In a preferred embodiment, "d" is about 5 and "e" is about 8. A commercial example of a nonionic surfactant is the product sold under the trade name ANTAROX® BL-14 (Rhodia Inc., Cranbury, N.J.).

Ethoxylated Fatty Acid Esters of Polyethylene Glycol

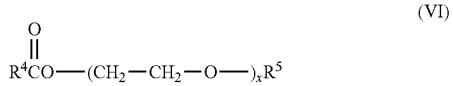
(VI)

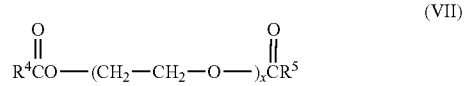
(VII)

In preferred embodiments $R^4$ is a hydrogen or a hydrocarbon chain containing about 10 to about 22 carbon atoms and may be branched or straight-chained and saturated or unsaturated and is selected from the group consisting of hydrogen, alkyl, alkoxy, aryl, alkaryl, alkylarylalkyl, arylalkyl, alkylamidoalkyl, and alkylaminoalkyl. $R^5$ is preferably a hydrocarbon chain containing about 1 to about 22 carbon atoms and may be branched or straight-chained and saturated or unsaturated and is selected from the group consisting of alkyl, alkoxy, aryl, alkaryl, alkylarylalkyl, arylalkyl, alkylamidoalkyl, and alkylaminoalkyl. In embodiments in which $R^4$ and $R^5$ represent alkyl, the groups preferably have about 5 to about 20 carbon atoms and more preferably have about 10 to about 18 carbon atoms. In embodiments in which $R^4$ and $R^5$ represent aryl, the groups preferably comprise a phenyl, diphenyl, diphenylether, or naphthalene moiety. In referred embodiments "x" is from about 1 to about 20. In certain preferred embodiments the structures are mono and diesters.

A commercial example of the nonionic surfactants are the products of dioleate ester of PEG 400, sold under the trade name ALKAMUS® 400DO (Rhodia Inc., Cranbury, N.J.).

The demulsifiers of the present invention contain modified alkanolamides as non ionic surfactant. In an preferred embodiment the modified alkanolamide is the product sold under the trade name ANTAROX AG 5 (Rhodia Inc., Cranbury, N.J.).

Demulsifiers of the present invention may be used alone or in combination with any of a number of additional demulsifiers described herein or known in the art including but not limited to alkylphenol formaldehyde condensation products such as alkylphenol formaldehyde, resin alkoxylates, polyalkylene glycols including polypropylene glycols and crosslinked polypropylene glycols, organic sulfonates, alkoxylated alcohols, alkoxylated polyols, fatty acids, complex resin esters, alkoxylated fatty amines, alkoxylated polymeric amines, and the like. Thus, for example, the demulsifier may comprise an alkylsulfosuccinate such as sodium diisooctylsulfosuccinate and an ethylene oxide/propylene oxide copolymer. Alternatively, as an example, the demulsifier may comprise an alkylsulfosuccinate and an ethoxylated fatty acid of ethylene glycol.

The demulsifiers of the present invention may also be used in combination with corrosion inhibitors, viscosity reducers, and other chemical treatments used in crude oil production, refining, and chemical processing. Optionally, a variety of conventional additives that do not adversely affect the demulsifier performance can be used. For example, optional additives may include bactericides and the like.

The water utilized for forming the demulsifier of this invention can be fresh water or salt water. In addition the water may contain dissolved organic salts, organic acids, organic acid salts, inorganic salts, or combinations thereof. The demulsifier may contain an organic solvent. Isopropyl alcohol is one example of a suitable organic solvent. Standard mixing procedures known in the art can be employed since heating of the solution and special agitation conditions are normally not necessary. Of course, if used under conditions of extreme cold such as found in Alaska or Siberia, normal heating procedures may be useful.

In another embodiment of the invention the initial pH of the demulsifier composition may be lowered or raised to impart stability. The decrease of pH may be by brought about by adding acid and/or buffers. Similarly, it may be suitable to add a base and/or buffers to increase the pH of the demulsifier composition.

In some embodiments, the method includes dispersing the demulsifier(s) in a suitable solvent or liquid carrier. Representative solvents and carriers include aromatic hydrocarbons, aliphatic hydrocarbons such as kerosene, glycols, glycol ethers, alcohols, water, hydrocarbons, aromatic solvents, fatty acid methyl esters, as well as similar compounds and combinations thereof. The liquid carrier may then be applied to the emulsion by any suitable process commonly known in the art.

EXAMPLES

The following examples are presented to illustrate the preparation and properties of demulsifier compositions and should not be construed to limit the scope of the invention, unless otherwise expressly indicated in the claims.

Table 1 shows various anionic and nonionic surfactants and the percent water separation achieved with each at a concentration of 2000 ppm, 30 minutes elapsed time, at room temperature. "Y" represents that separation was observed but no precise value was collected.

TABLE 1

| Surfactant trade name | % water separation 2000 ppm level 30 min at room temp |
|---|---|
| Rhodoclean HP | 100 |

TABLE 2

Surfactant blends as demulsifiers at 250 ppm levels.

| ID No. | Products | ppm | 0 min | 1 min | 5 min | 60 min | interface | Water layer |
|---|---|---|---|---|---|---|---|---|
| 0 | Solvent | 0 | 0% | 0% | 0% | 0% | — | — |
| 5-9a | Rhodoclean HP + Geropon SDS | 250 | 50% | 100% | 100% | 100% | hazy | Clear |

Although the invention herein has been described with reference to particular embodiments and examples, it is to be understood that these embodiments are merely illustrative of the principles and applications of the present invention. Other embodiments have been suggested and still others may occur to those skilled in the art upon a reading and understanding of the specification. It is intended that all such embodiments be included within the scope of this invention. It is therefore to be understood that numerous modifications may be made to the illustrative embodiments and that other arrangements may be devised without departing from the spirit and scope of the present invention as defined by the claims.

What is claimed is:

1. A method for breaking an emulsion of oil and water comprising contacting the emulsion with a demulsifier comprising a terpene alkoxylate wherein the terpene alkoxylate has the following formula (VIII):

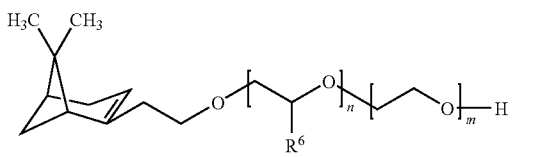

(VIII)

wherein $R^6$ is methyl, n is about 15 to 20, and m is about 3 to 7.

2. The method of claim 1 further comprising dispensing the demulsifier in a suitable solvent prior to contacting the demulsifier with the emulsion.

3. The method of claim 2 wherein the solvent is selected from the group consisting of glycols, glycol ethers, alcohols, water, hydrocarbons, aromatic solvents, fatty acid methyl esters, and combinations thereof.

4. The method of claim 1 wherein the emulsion is a water-in-oil emulsion.

5. The method of claim 1 wherein the demulsifier further comprises one or more surfactants selected from the group consisting of alkylsulfosuccinates, alkylphosphonic acids, salts of alkylsulfosuccinates, salts of alkylphosphonic acids, ethylene oxide/propylene oxide copolymers, ethoxylated fatty acid esters of polyethylene glycol, and modified alkanimides.

6. The method of claim 5 wherein the further surfactant is an alkyl phosphonic acid or salt of the formula $R^1PO_3MM^1$ (I); phosphinic acid and salts of the formula $R^1R^2POM$ (IX); alkyl phosphoric acids and salts of the formula $R^1OPO_3MM^1$ (X); and dialkyl phosphoric acids and salts of the formula $(R^1O)(R^2O)POOM^1$ (XI);

wherein $R^1$ and $R^2$ are may be the same or different alkyl groups and may be branched or linear; M and $M^1$ can be the same or different, selected from the group consisting of hydrogen, an alkali metal such as sodium or potassium, and an ammonium salt.

* * * * *

UNITED STATES PATENT AND TRADEMARK OFFICE
CERTIFICATE OF CORRECTION

PATENT NO. : 7,671,099 B2  Page 1 of 1
APPLICATION NO. : 12/191130
DATED : March 2, 2010
INVENTOR(S) : Ruela Talingting Pabalan et al.

It is certified that error appears in the above-identified patent and that said Letters Patent is hereby corrected as shown below:

In the Title of Invention; the title should be "METHOD FOR SEPARATING CRUDE OIL EMULSIONS"

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,671,099 B2
APPLICATION NO. : 12/191130
DATED : March 2, 2010
INVENTOR(S) : Ruela Talingting Pabalan et al.

It is certified that error appears in the above-identified patent and that said Letters Patent is hereby corrected as shown below:

Title Page, Item (54) and at Column 1, lines 1 and 2, the title should be "METHOD FOR SEPARATING CRUDE OIL EMULSIONS"

This certificate supersedes the Certificate of Correction issued May 4, 2010.

Signed and Sealed this

First Day of June, 2010

David J. Kappos
*Director of the United States Patent and Trademark Office*